(12) United States Patent
Sun (10) Patent No.: US 12,086,355 B2
(45) Date of Patent: Sep. 10, 2024

(54) TOUCH SCREEN SCANNING METHOD, DEVICE, AND SYSTEM

(71) Applicant: TCL China Star Optoelectronics Technology Co., Ltd., Guangdong (CN)

(72) Inventor: Junjie Sun, Guangdong (CN)

(73) Assignee: TCL China Star Optoelectronics Technology Co., Ltd., Shenzhen (CN)

( * ) Notice: Subject to any disclaimer, the term of this patent is extended or adjusted under 35 U.S.C. 154(b) by 0 days.

(21) Appl. No.: 17/435,054

(22) PCT Filed: May 31, 2021

(86) PCT No.: PCT/CN2021/097524
§ 371 (c)(1),
(2) Date: Aug. 31, 2021

(87) PCT Pub. No.: WO2022/241837
PCT Pub. Date: Nov. 24, 2022

(65) Prior Publication Data
US 2024/0012507 A1 Jan. 11, 2024

(30) Foreign Application Priority Data
May 17, 2021 (CN) .......................... 202110533223.4

(51) Int. Cl.
*G06F 3/041* (2006.01)
*G06F 3/044* (2006.01)
*G06F 3/046* (2006.01)

(52) U.S. Cl.
CPC ........ *G06F 3/04166* (2019.05); *G06F 3/0418* (2013.01); *G06F 3/044* (2013.01); *G06F 3/046* (2013.01); *G06F 2203/04106* (2013.01)

(58) Field of Classification Search
CPC .... G06F 3/04166; G06F 3/0418; G06F 3/044; G06F 3/046; G06F 2203/04106; G06F 3/041; G09G 3/36; G09G 5/00
See application file for complete search history.

(56) References Cited

U.S. PATENT DOCUMENTS

| 10,891,002 B2 | 1/2021 | Feng |
| 2014/0002413 A1* | 1/2014 | Kim ...................... G06F 3/0446 345/174 |
| 2014/0160041 A1 | 6/2014 | Kim et al. |
| 2015/0185905 A1* | 7/2015 | Ma ........................ G06F 3/0412 345/87 |

FOREIGN PATENT DOCUMENTS

| CN | 201765574 | 3/2011 |
| CN | 102609128 | 7/2012 |

(Continued)

OTHER PUBLICATIONS

International Search Report and the Written Opinion Dated Feb. 11, 2022 From the International Searching Authority Re. Application No. PCT/CN2022/097524 and Its Translation Into English. (14 Pages).

(Continued)

*Primary Examiner* — Michael A Faragalla (57) ABSTRACT

A touch screen scanning method, a device, and a system are provided. Only a display scan or one touch scan is performed in each period of each frame scanning cycle, and then the display scan and/or at least one touch scan is completed in each frame scanning cycle. The display scan and the at least one touch scan do not interfere with each other during each process, thereby ensuring accuracy of a scan result and display performance of a touch screen.

14 Claims, 5 Drawing Sheets

(56) References Cited

FOREIGN PATENT DOCUMENTS

| | | |
|---|---|---|
| CN | 104375732 | 2/2015 |
| CN | 106055139 | 10/2016 |
| CN | 108644163 | 10/2018 |
| CN | 108664163 | 10/2018 |
| CN | 110515498 | 11/2019 |
| JP | 2014-164770 | 9/2014 |
| JP | 2016-206791 | 12/2016 |

OTHER PUBLICATIONS

Notice of Reasons for Refusal Dated Jul. 11, 2023 From the Japan Patent Office Re. Application No. 2021-536380 and Its Translation Into English. (8 Pages).

Notification of Decision of Rejection Dated Apr. 5, 2023 From The State Intellectual Property Office of the People's Republic of China Re. Application No. 202110533223.4 and Its Translation Into English. (13 Pages).

Notification of Office Action and Search Report Dated Apr. 8, 2022 From The State Intellectual Property Office of the People's Republic of China Re. Application No. 202110533223.4 and Its Translation Into English. (14 Pages).

Notification of Office Action Dated Dec. 2, 2022 From The State Intellectual Property Office of the People's Republic of China Re. Application No. 202110533223.4 and Its Translation Into English. (13 Pages).

Notice of Reasons for Refusal Dated Dec. 19, 2023 From the Japan Patent Office Re. Application No. 2021-536380 and Its Translation Into English. (6 Pages).

* cited by examiner

TOUCH SCREEN SCANNING METHOD, DEVICE, AND SYSTEM

RELATED APPLICATIONS

This application is a National Phase of PCT Patent Application No. PCT/CN2021/097524 having International filing date of May 31, 2021, which claims the benefit of priority of Chinese Patent Application No. 202110533223.4 filed on May 17, 2021. The contents of the above applications are all incorporated by reference as if fully set forth herein in their entirety.

FIELD AND BACKGROUND OF THE INVENTION

The present disclosure relates to the field of display technologies, and in particular to a touch screen scanning method, a device, and a system.

At present, mid-to-high end touch screens mainly use capacitive touch screens and electromagnetic touch screens. An advantage of the capacitive touch screens is that they can be operated directly with fingers, or can be operated with a capacitive pen, which is used in ordinary handwriting. An advantage of the electromagnetic touch screens is that they can be accurately touched with an electromagnetic pen. The accuracy of the electromagnetic pen is generally higher than that of the capacitive pen, so the electromagnetic touch screen with the capacitive pen is widely used in handwriting fields, such as professional drawing and professional design. For ease of use, current mid-to-high end touch screens generally have three functions including display, capacitive touch, and electromagnetic touch. In order to reduce a thickness of the screen, an in-cell technology can be used to integrate both the capacitive screen and the electromagnetic screen inside the display panel.

In order to increase a scanning frequency to improve a sampling accuracy, current touch screens generally perform two or three of three scanning methods including a display scan, a capacitive touch scan, and an electromagnetic touch scan in a same period. A display signal, a capacitive touch signal, and an electromagnetic touch signal are likely to interfere with each other. For example, a band of an electromagnetic wave generated by the electromagnetic pen may overlap with a band corresponding to a frequency of the display signal, causing the frequency band of the electromagnetic wave generated by the electromagnetic pen and the frequency band of the display signal to interfere with each other. Thus, a sampling of the electromagnetic touch signal of the electromagnetic pen is not accurate, or display performance of the display signal is unstable. In particular, when the mid-to-high-end touch screen using the in-cell technology is working, since the capacitive screen and the electromagnetic screen are integrated inside the display panel, the display signal, the capacitive touch signal, and the electromagnetic touch signal are more likely to interfere with each other.

Therefore, it is necessary to propose a touch screen scanning method, a device, and a system to avoid a risk of interference between the display scan and various touch scans when the touch screens are working.

SUMMARY OF THE INVENTION

In order to increase a scanning frequency to improve a sampling accuracy, a current touch screen generally performs two or three of three scanning methods including a display scan, a capacitive touch scan, and an electromagnetic touch scan in a same period. A display signal, a capacitive touch signal, and an electromagnetic touch signal are likely to interfere with each other. For example, a band of an electromagnetic wave generated by an electromagnetic pen may overlap with a band corresponding to a frequency of the display signal, causing the frequency band of the electromagnetic wave generated by the electromagnetic pen and the frequency band of the display signal to interfere with each other. Thus, a sampling of the electromagnetic touch signal of the electromagnetic pen is not accurate, or display performance of the display signal is unstable.

In order to solve the above-mentioned problem, embodiments of the present disclosure provide a touch screen scanning method, a device, and a system.

In a first aspect, an embodiment of the present disclosure provides a touch screen scanning method, including: performing a display scan and/or at least one touch scan in each frame scanning cycle; performing one of the display scan and the at least one touch scan in each period of each the frame scanning cycle; and completing the display scan and/or the at least one touch scan in each the frame scanning cycle.

In some embodiments, the touch scan is one of a capacitive touch scan, an electromagnetic touch scan, a resistive touch scan, an infrared touch scan, an acoustic touch scan, and an optical touch scan.

In some embodiments, the touch scan is the capacitive touch scan or the electromagnetic touch scan.

In some embodiments, each the frame scanning cycle includes a display period and a field blanking period. The steps of performing one of the display scan and the at least one touch scan in each period of each the frame scanning cycle, and completing the display scan and/or the at least one touch scan in each the frame scanning cycle include: performing the display scan in the display period; performing the capacitive touch scan and the electromagnetic touch scan in a time-sharing manner in the field blanking period; and completing the capacitive touch scan and the electromagnetic touch scan in the field blanking period.

In some embodiments, the field blanking period includes a first period and a second period that are performed sequentially. The step of performing the capacitive touch scan and the electromagnetic touch scan in the time-sharing manner in the field blanking period includes: performing the electromagnetic touch scan in the first period, and performing the capacitive touch scan in the second period; or performing the capacitive touch scan in the first period and performing the electromagnetic touch scan in the second period.

In some embodiments, the electromagnetic touch scan and the capacitive touch scan are alternately performed in the field blanking period.

In some embodiments, each the frame scanning cycle includes a plurality of sub-frame scanning cycles, and each of the sub-frame scanning cycles includes a sub-display period and a sub-field blanking period. The steps of performing one of the display scan and the at least one touch scan in each period of each the frame scanning cycle, and completing the display scan and/or the at least one touch scan in each the frame scanning cycle include: performing the display scan in the sub-display period; performing the electromagnetic touch scan in a portion of the sub-field blanking period, and performing the capacitive touch scan in another portion of the sub-field blanking period.

In some embodiments, each the frame scanning cycle includes a first portion of the sub-frame scanning cycle and a second portion of the sub-frame scanning cycle that are performed sequentially. The step of performing the electromagnetic touch scan in a portion of the sub-field blanking period, and performing the capacitive touch scan in another portion of the sub-field blanking period includes: performing the electromagnetic touch scan in the first portion of the sub-field blanking period of the sub-frame scanning cycle, and performing the capacitive touch scan in the second portion of the sub-field blanking period of the sub-frame scanning cycle; or performing the capacitive touch scan in the first portion of the sub-field blanking period of the sub-frame scanning cycle, and performing the electromagnetic touch scan in the second portion of the sub-field blanking period of the sub-frame scanning cycle.

In some embodiments, the step of performing the electromagnetic touch scan in a portion of the sub-field blanking period, and performing the capacitive touch scan in another portion of the sub-field blanking period includes: alternately performing the electromagnetic touch scan and the capacitive touch scan in the sub-field blanking periods of the plurality of sub-frame scanning cycles performed sequentially.

In a second aspect, an embodiment of the present disclosure provides a touch screen scanning device. The scanning device is configured to perform a display scan and/or at least one touch scan in each frame scanning cycle, perform one of the display scan and the at least one touch scan in each period of each the frame scanning cycle, and complete the display scan and/or the at least one touch scan in each the frame scanning cycle.

In some embodiments, the touch scan is one of a capacitive touch scan, an electromagnetic touch scan, a resistive touch scan, an infrared touch scan, an acoustic touch scan, and an optical touch scan.

In some embodiments, the touch scan is the capacitive touch scan or the electromagnetic touch scan.

In some embodiments, each the frame scanning cycle includes a display period and a field blanking period, and the scanning device includes a first display scan module and a first touch scan module. The first display scan module is configured to perform the display scan in the display period. The first touch scan module is configured to perform the capacitive touch scan and the electromagnetic touch scan in a time-sharing manner in the field blanking period, and complete the capacitive touch scan and the electromagnetic touch scan in the field blanking period.

In some embodiments, the field blanking period includes a first period and a second period that are performed sequentially, and the first touch scan module includes a first electromagnetic touch scan unit and a first capacitive touch scan unit. The first electromagnetic touch scan unit is configured to perform the electromagnetic touch scan in the first period, and the first capacitive touch scan unit is configured to perform the capacitive touch scan in the second period. Alternatively, the first capacitive touch scan unit is configured to perform the capacitive touch scan in the first period, and the first electromagnetic touch scan unit is configured to perform the electromagnetic touch scan in the second period.

In some embodiments, the first touch scan module further includes a second electromagnetic touch scan unit and a second capacitive touch scan unit. The second electromagnetic touch scan unit and the second capacitive touch scan unit are configured to alternatively perform the electromagnetic touch scan and the capacitive touch scan in the field blanking period.

In some embodiments, each the frame scanning cycle includes a plurality of sub-frame scanning cycles, each of the sub-frame scanning cycles includes a sub-display period and a sub-field blanking period, and the scanning device further includes a second display scan module and a second touch scan module. The second display scan module is configured to perform the display scan in the sub-display period. The second touch scan module is configured to perform the electromagnetic touch scan in a portion of the sub-field blanking period, and perform the capacitive touch scan in another portion of the sub-field blanking period.

In some embodiments, each the frame scanning cycle includes a first portion of the sub-frame scanning cycle and a second portion of the sub-frame scanning cycle that are performed sequentially, and the second touch scan module includes a third electromagnetic touch scan unit and a third capacitive touch scan unit. The third electromagnetic touch scan unit is configured to perform the electromagnetic touch scan in the first portion of the sub-field blanking period of the sub-frame scanning cycle, and the third capacitive touch scan unit is configured to perform the capacitive touch scan in the second portion of the sub-field blanking period of the sub-frame scanning cycle. Alternatively, the third capacitive touch scan unit is configured to perform the capacitive touch scan in the first portion of the sub-field blanking period of the sub-frame scanning cycle, and the third electromagnetic touch scan unit is configured to perform the electromagnetic touch scan in the second portion of the sub-field blanking period of the sub-frame scanning cycle.

In some embodiments, the second touch scan module further includes a fourth electromagnetic touch scan unit and a fourth capacitive touch scan unit. The fourth electromagnetic touch scan unit and the fourth capacitive touch scan unit are configured to alternatively perform the electromagnetic touch scan and the capacitive touch scan in the sub-field blanking periods of the plurality of sub-frame scanning cycles performed sequentially.

In a third aspect, an embodiment of the present disclosure provides a touch screen scanning system, including: a timing controller, a touch signal processor, a front-end system chip, and the above-mentioned touch screen scanning device.

The touch screen scanning device is configured to acquire a touch signal of the touch screen and transmit the display signal to a touch screen.

The timing controller is configured to control the acquisition of the signal of the touch screen and control a timing of transmitting the display signal to the touch screen.

The processor is configured to perform a data processing on the acquired touch signal.

The front-end system chip is configured to transmit an image signal and the touch signal after performing the data processing to the timing controller.

In some embodiments, the touch signal processor includes a filter circuit, and the filter circuit is configured to filter the acquired touch signal.

The embodiments of the present disclosure provide the touch screen scanning method, the device, and the system. When the timing controller of the touch screen controls more than two touch scan signals at the same time, if more than two touch scans are performed at the same period, the two touch scan signals are likely to interfere with each other. In the touch screen scanning method, the device, and the system, the display scan and/or the at least one touch scan are performed in a time-sharing manner in each frame scanning cycle. That is, only the display scan or only the one touch scan is performed in each period of each frame scanning cycle. Thus, the display scan and/or the at least one touch scan are completed in each frame scanning cycle, such that the display scan and the at least one touch scan do not interfere with each other when they are performed, thereby ensuring accuracy of a scan result and display performance of the touch screen.

DESCRIPTION OF SPECIFIC EMBODIMENTS OF THE INVENTION

In order to make purposes, technical solutions, and effects of the present disclosure clearer and specific, the present disclosure will be further described in detail below with reference to the accompanying drawings and embodiments. It should be understood that the specific embodiments described herein are only used to explain the present disclosure, and are not used to limit the present disclosure.

In a scanning process of a display panel, vertical blanking (Vblank) is a time concept corresponding to horizontal blanking (Hblank). In a scanning process of converting an optical signal into an electrical signal, the scanning always starts from an upper left corner of an image and moves horizontally to the right, and a scanning point also moves downwards at a relatively low rate. When the scanning point arrives at the right edge of the image, the scanning point quickly returns to the left to restart to scan the second row below a start point of the first row. A return process between rows is referred to as horizontal blanking (Hblank) or line blanking. A complete image scanning signal includes a sequence of row signals separated by horizontal blanking intervals, and is referred to as a frame. After scanning a frame, the scanning point needs to return from a lower right corner of the image to the upper left corner of the image to start to scan a new frame. This time interval is referred to as vertical blanking (Vblank) or field blanking.

In order to increase a scanning frequency to improve a sampling accuracy, a current touch screen generally performs a display scan and any type of a touch scan in a same period, or performs more than two types of touch scans, such as two or three of three functions of display, capacitive touch, and electromagnetic touch. However, when a mid-to-high end touch screen made with an in-cell technology is working, it will cause interference between a display scan signal and a touch scan signal or between various touch scan signals.

In order to solve the above-mentioned problems, the present disclosure provides a touch screen scanning method. The touch screen scanning method includes steps of performing a display scan and/or at least one touch scan in each frame scanning cycle; performing one of the display scan and the at least one touch scan in each period of each the frame scanning cycle; and completing the display scan and/or the at least one touch scan in each the frame scanning cycle.

In each period of each frame scanning cycle, one of the display scan or the at least one touch scan is performed. That is, in each frame scanning cycle, the display scan and the at least one touch scan are performed in a time-sharing manner. The time-sharing manner means that only the display scan or one touch scan is performed in a period.

In the touch screen scanning method of the embodiment of the present disclosure, if more than two touch scans are performed by a touch screen at the same period, two touch scan signals are likely to interfere with each other. In the touch screen scanning method, a device, and a system, the display scan and/or the at least one touch scan are performed in the time-sharing manner in each frame scanning cycle. That is, only the display scan or only one touch scan is performed in each period of each frame scanning cycle. Thus, the display scan and/or the at least one touch scan are completed in each frame scanning cycle, such that the display scan and the at least one touch scan do not interfere with each other when they are performed, thereby ensuring accuracy of a scan result and display performance of the touch screen.

It is understandable that the touch scan is one of a capacitive touch scan, an electromagnetic touch scan, a resistive touch scan, an infrared touch scan, an acoustic touch scan, and an optical touch scan.

For example, when the touch screen is used as an electromagnetic capacitive touch screen, the touch scan is the capacitive touch scan or the electromagnetic touch scan. It is worth noting that the touch screen scanning method may be applied to a touch screen that uses an external technology to install an electromagnetic screen and/or a capacitive screen outside a display panel, and may also be applied to a touch screen that uses an in-cell technology to integrate an electromagnetic screen and/or a capacitive screen inside a display panel, and especially suitable for the latter.

At this time, the touch screen scanning method includes the following. In each period of each frame scanning cycle, the display scan, the capacitive touch scan, and the electromagnetic touch scan are performed. That is, the display scan, the capacitive touch scan, and the electromagnetic touch scan are performed in a time-sharing manner in each frame scanning cycle. Thus, in each frame scanning cycle, the display scan, the capacitive touch scan, or the electromagnetic touch scan is completed. The time-sharing manner means that only one of the display scan, the capacitive touch scan, and the electromagnetic touch scan is performed in one period. That is, only the display scan, the capacitive touch scan, or the electromagnetic touch scan is performed in one period.

In the touch screen scanning method of the embodiment of the present disclosure, only one of the display scan, the capacitance scan, and the electromagnetic touch scan is performed in each period of each frame scanning cycle. Thus, in each frame scanning cycle, the display scan, the capacitive touch scan, or the electromagnetic touch scan is completed, so that three scanning methods of the display scan, the capacitive touch scan, and the electromagnetic touch scan do not interfere with each other, so as to ensure the accuracy of the scan results and the display performance of the touch screen.

It is understandable that in each frame scanning cycle, a sum of a duration corresponding to the display scan, a duration corresponding to the capacitive touch scan, and a duration corresponding to the electromagnetic touch is equal to a duration corresponding to one frame scanning cycle.

In some embodiments, each frame scanning cycle includes a display period and a field blanking period. The display scan, the capacitive touch scan, and the electromagnetic touch scan are performed in the time-sharing manner. In each frame scanning cycle, the display scan, the capacitive touch scan, and the electromagnetic touch scan are completed. Specifically, in the display period, the display scan is performed. In the field blanking period, the capacitive touch scan and the electromagnetic touch scan are performed in a time-sharing manner. In the field blanking period, the capacitive touch scan and the electromagnetic touch scan are completed.

It is understandable that in each field blanking period, a sum of a duration corresponding to the capacitive touch scan and a duration corresponding to the electromagnetic touch scan is equal to a duration corresponding to the field blanking period.

It should be noted that an electromagnetic touch signal and a capacitive touch signal may generate at the same time. Thus, a priority of the electromagnetic touch scan may be set higher than that of the capacitive touch scan. For example, when an electromagnetic pen is used for the electromagnetic touch, if a capacitive touch signal is generated by a wrong hand touch, only the electromagnetic touch signal is acquired during the period of the electromagnetic touch scan. In the same way, a priority of the capacitive touch scan may also be set higher than that of the electromagnetic touch scan. For example, when a capacitive touch signal is generated when touching by a hand, if an electromagnetic touch signal is generated by an electromagnetic pen by mistake, only the capacitive touch signal is acquired during the period of the capacitive touch scan.

Figure 1:
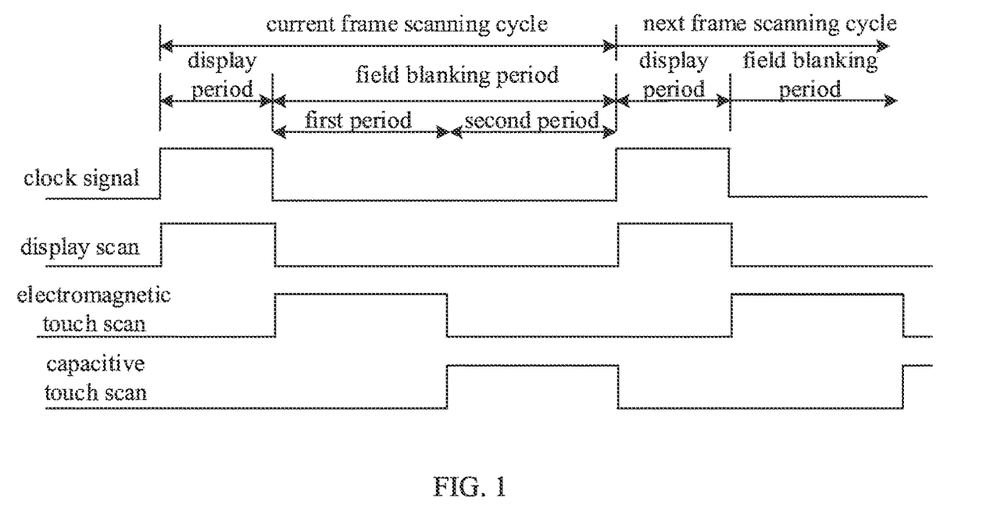
FIG. 1 is a schematic diagram of a first sequence of a touch screen scanning method of an embodiment of the present disclosure.
Figure 2:
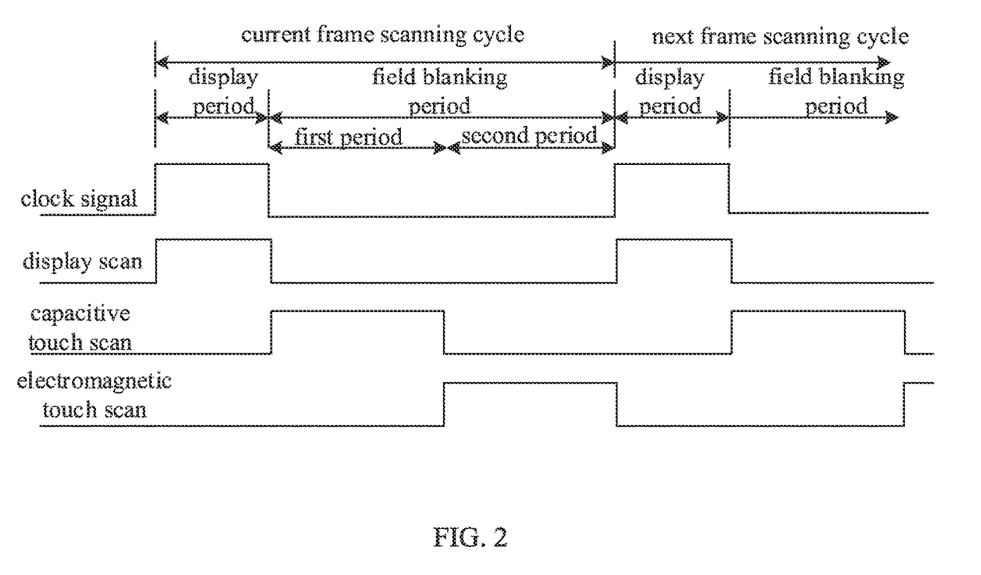
FIG. 2 is a schematic diagram of a second sequence of a touch screen scanning method of an embodiment of the present disclosure.

In some embodiments, the field blanking period includes a first period and a second period that are performed sequentially. In the field blanking period, the capacitive touch scan and the electromagnetic touch scan are performed in a time-sharing manner. Also, the capacitive touch scan and electromagnetic touch scan are completed in the field blanking period. Specifically, FIG. 1 is a schematic diagram of a first sequence of a touch screen scanning method of an embodiment of the present disclosure. As shown in FIG. 1, the electromagnetic touch scan is performed in the first period, and the capacitive touch scan is performed in the second period. Alternatively, FIG. 2 is a schematic diagram of a second sequence of a touch screen scanning method of an embodiment of the present disclosure. As shown in FIG. 2, the capacitive touch scan is performed in the first period, and the electromagnetic touch scan is performed in the second period.

Specifically, in the field blanking period, the electromagnetic touch scan can be performed first, and then the capacitive touch scan is performed. Alternatively, the capacitive touch scan can be performed first, and then the electromagnetic touch scan is performed. That is, if the field blanking period of each frame scanning cycle includes the first period and the second period that are performed sequentially, the electromagnetic touch scan can be performed in the first period, and the capacitive touch scan can be performed in the second period. Alternatively, the capacitive touch scan is performed in the first period, and the electromagnetic touch scan is performed in the second period.

For a touch screen that is mainly used as an electromagnetic screen, the electromagnetic touch signal is acquired first, and then the capacitive touch signal is acquired. In comparison with the capacitive touch signal, the electromagnetic touch signal is acquired and fed back faster, thereby improving the accuracy of acquiring the electromagnetic touch signal. Similarly, for a touch screen that is mainly used as a capacitive screen, the capacitive touch signal is acquired first, and then the electromagnetic touch signal is acquired. In comparison with the electromagnetic touch signal, the capacitive touch signal is acquired and fed back faster, thereby improving the accuracy of acquiring the capacitive touch signal.

Figure 3:
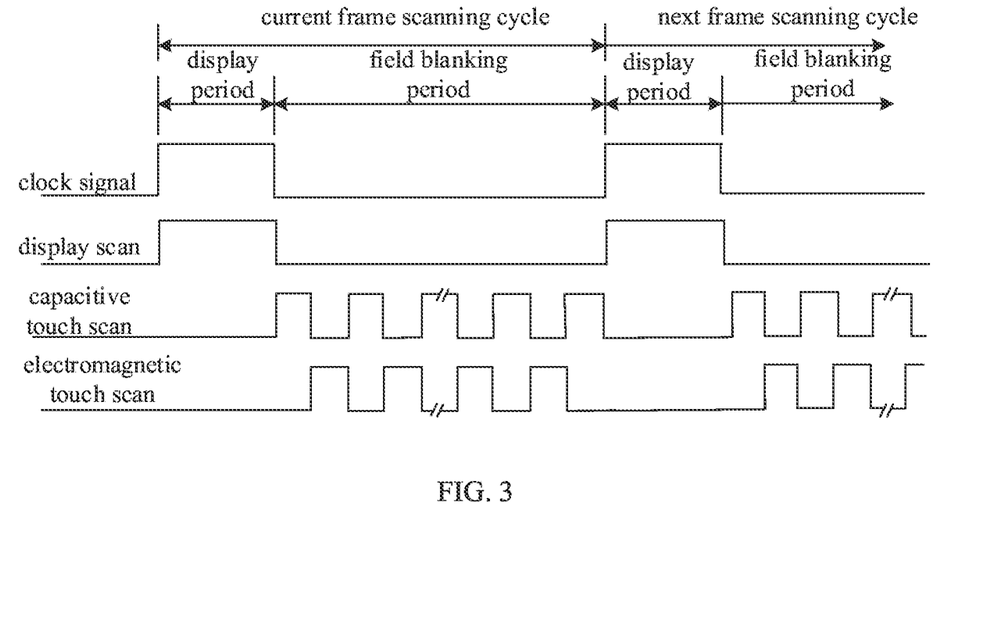
FIG. 3 is a schematic diagram of a third sequence of a touch screen scanning method of an embodiment of the present disclosure.

In some embodiments, FIG. 3 is a schematic diagram of a third sequence of a touch screen scanning method of an embodiment of the present disclosure. As shown in FIG. 3, in the field blanking period, the electromagnetic touch scan and the capacitive touch scan are alternately performed.

Specifically, the electromagnetic touch scan and the capacitive touch scan can be performed alternately in the field blanking period, so as to increase a sampling report rate of the electromagnetic touch scan and the capacitive touch scan without affecting display performance, thereby making the touch display operation smoother.

It can be understood that in FIG. 1 or FIG. 2, the electromagnetic touch scan and the capacitive touch scan are performed individually one after the other. In FIG. 3, the electromagnetic touch scan and the capacitive touch scan are performed alternately. The method shown in FIG. 1 or FIG. 2 can be combined with the method shown in FIG. 3. That is, in each field blanking period, the electromagnetic touch scan and/or the capacitive touch scan are performed at will. Thus, obtaining results of the electromagnetic touch scan and the capacitive touch scan are accelerated, and the sampling report rate of the electromagnetic touch scan and the capacitive touch scan is improved, thereby making the touch display operation more smooth.

It should be noted that double slashes in waveforms in FIG. 3 and other drawings below indicate that there are a plurality of pulses.

Furthermore, in addition to each frame scanning cycle in the foregoing embodiments including one display period and one field blanking period, each frame scanning cycle may also include a plurality of sub-frame scanning cycles (not shown in the drawings). Each sub-frame scanning cycle includes a sub-display period and a sub-field blanking period. The display scan, the capacitive touch scan, and the electromagnetic touch scan are performed in a time-sharing manner. In each frame scanning cycle, the display scan, the capacitive touch scan, and the electromagnetic touch scan are completed. Specifically, in the sub-display period, the display scan is performed. In a portion of the sub-field blanking period, the electromagnetic touch scan is performed. Moreover, in the other portion of the sub-field blanking period, the capacitive touch scan is performed.

Specifically, in this embodiment, each frame scanning cycle is divided into the plurality of sub-frame scanning cycles. Each sub-frame scanning cycle includes the sub-display period and the sub-field blanking period. The display scan is performed in each sub-display period. In each sub-field blanking period, only the electromagnetic touch scan or the capacitive touch scan is performed. Thus, in a portion of the sub-field blanking period, the electromagnetic touch scan is performed. Moreover, in the other portion of the sub-field blanking period, the capacitive touch scan is performed. Therefore, in each frame scanning cycle, the display scan, the capacitive touch scan, and the electromagnetic touch scan are completed.

Thus, obtaining results of the electromagnetic touch scan and the capacitive touch scan is accelerated, and the sampling report rate of the display signal combined with the electromagnetic touch signal and the display signal combined with the capacitive touch signal is improved, thereby making the touch display operation more smooth.

It is understandable that in each sub-field blanking period, a sum of a duration of the capacitive touch scan and a duration of the electromagnetic touch scan is equal to a duration of sub-field blanking period.

Figure 4:
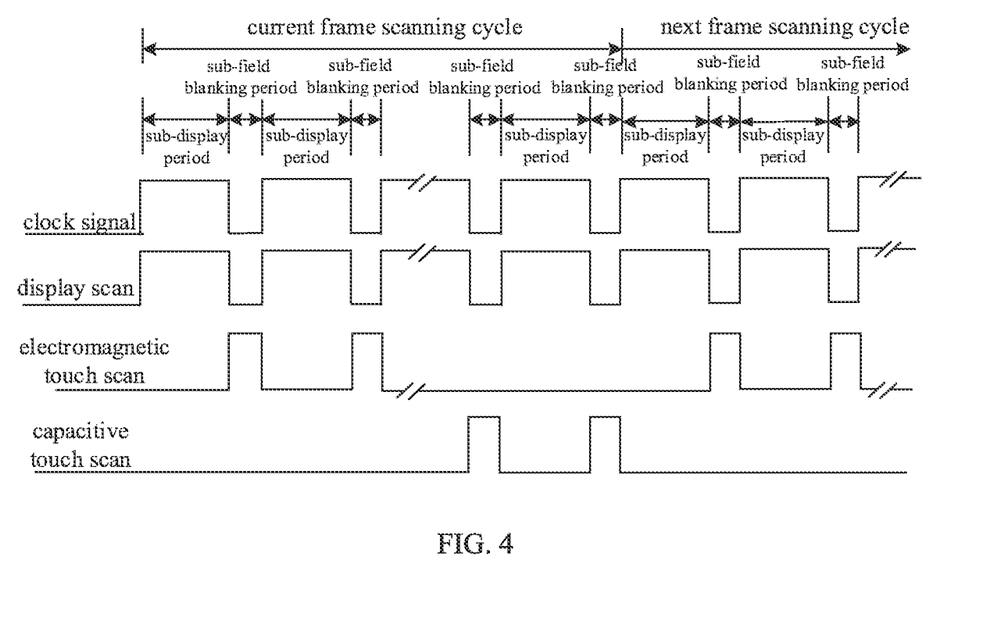
FIG. 4 is a schematic diagram of a fourth sequence of a touch screen scanning method of an embodiment of the present disclosure.
Figure 5:
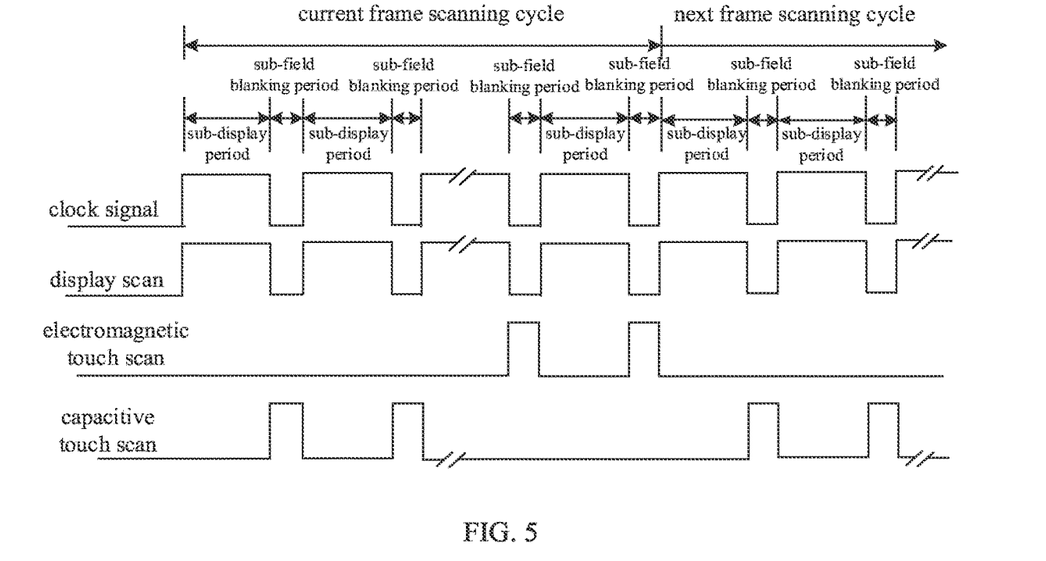
FIG. 5 is a schematic diagram of a fifth sequence of a touch screen scanning method of an embodiment of the present disclosure.

In some embodiments, each frame scanning cycle includes a first portion of the sub-frame scanning cycle and a second portion of the sub-frame scanning cycle that are performed sequentially. In a portion of the sub-field blanking period, the electromagnetic touch scan is performed. Moreover, in the other portion of the sub-field blanking period, the capacitive touch scan is performed. Specifically, FIG. 4 is a schematic diagram of a fourth sequence of a touch screen scanning method of an embodiment of the present disclosure. As shown in FIG. 4, the electromagnetic touch scan is performed in the first portion of the sub-field blanking period of the sub-frame scanning cycle, and the capacitive touch scan is performed in the second portion of the sub-field blanking period of the sub-frame scanning cycle. Alternatively, FIG. 5 is a schematic diagram of a fifth sequence of a touch screen scanning method of an embodiment of the present disclosure. As shown in FIG. 5, the capacitive touch scan is performed in the first portion of the sub-field blanking period of the sub-frame scanning cycle, and the electromagnetic touch scan is performed in the second portion of the sub-field blanking period of the sub-frame scanning cycle.

Specifically, the electromagnetic touch scan can be performed first in a previous portion of the sub-field blanking period, and then the capacitive touch scan can be performed in a latter portion of the sub-field blanking period. That is, each frame scanning cycle includes the first portion of the sub-frame scanning cycle and the second portion of the sub-frame scanning cycle that are performed sequentially. The electromagnetic touch scan can be performed in the first portion of the sub-field blanking period of the sub-frame scanning cycle. The capacitive touch scan can be performed in the second portion of the sub-field blanking period of the sub-frame scanning cycle. Alternatively, the capacitive touch scan can be performed in the first portion of the sub-field blanking period of the sub-frame scanning cycle. The electromagnetic touch scan can be performed in the second portion of the sub-field blanking period of the sub-frame scanning cycle.

For the touch screen that is mainly used as the electromagnetic screen, the acquired electromagnetic touch signal is inserted into the display signal first, and then the acquired capacitive touch signal is inserted into the display signal. In comparison with the display signal combined with the capacitive touch signal, the display signal combined with the electromagnetic touch signal can display faster, thereby increasing a display speed of the display signal combined with the electromagnetic touch signal. In the same way, for the touch screen that is mainly used as the capacitive screen, the acquired capacitive touch signal is inserted into the display signal first, and then the acquired electromagnetic touch signal is inserted into the display signal. In comparison with the display signal combined with the electromagnetic touch signal, the display signal combined with the capacitive touch signal can display faster, and a display speed of the display signal combined with the capacitive touch signal is improved.

In some embodiments, in the portion of the sub-field blanking period, the electromagnetic touch scan is performed, and in another portion of the sub-field blanking period, the capacitive touch scan is performed, which specifically includes the following.

Figure 6:
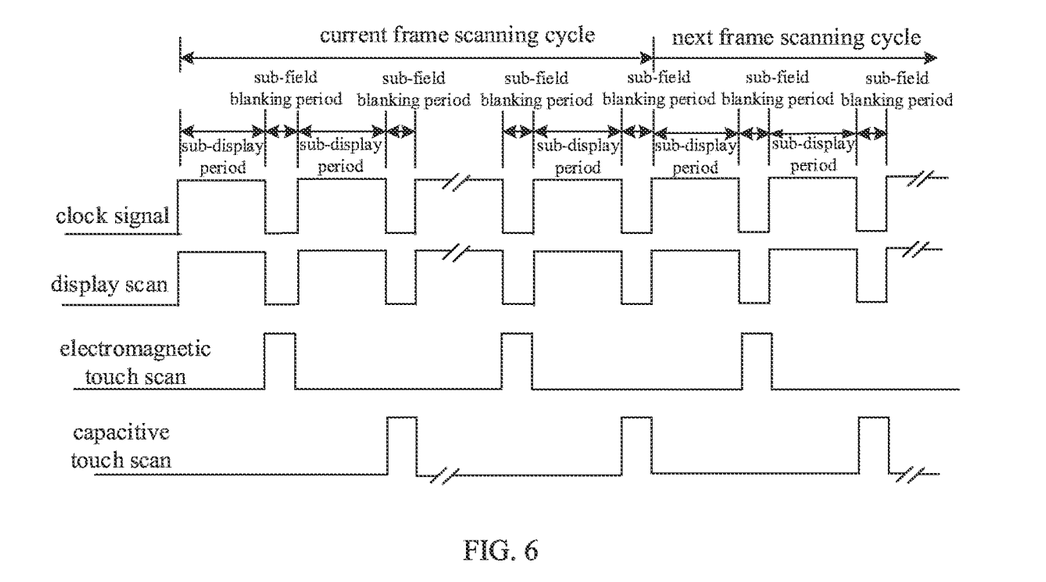
FIG. 6 is a schematic diagram of a fifth sequence of a touch screen scanning method of an embodiment of the present disclosure.

FIG. 6 is a schematic diagram of a sixth sequence of a touch screen scanning method of an embodiment of the present disclosure. As shown in FIG. 6, in the sub-field blanking period of the plurality of sub-frame scanning cycles performed sequentially, the electromagnetic touch scan and the capacitive touch scan are performed alternately.

Specifically, in the plurality of sub-field blanking periods that are sequentially performed, the electromagnetic touch scan and the capacitive touch scan can be performed alternately. Only the electromagnetic touch scan or the capacitive touch scan is performed in each sub-field blanking period. As a result, it is possible to increase the sampling report rate of the electromagnetic touch scan and the capacitive touch scan without affecting the display performance, thereby making the touch display operation more smooth.

It can be understood that in FIG. 4 or FIG. 5, the electromagnetic touch scan and the capacitive touch scan are performed one after the other. In FIG. 6, the electromagnetic touch scan and the capacitive touch scan are performed alternately. The method shown in FIG. 4 or FIG. 5 can be combined with the method shown in FIG. 6. That is, in each sub-field blanking period, the electromagnetic touch scan and/or the capacitive touch scan are performed at will. Thus, results of the electromagnetic touch scan and the capacitive touch scan are accurately obtained, and the sampling report rate of the electromagnetic touch scan and the capacitive touch scan is improved, thereby making the touch display operation more smooth.

Based on the same inventive concept, an embodiment of the present disclosure also provides a touch screen scanning device 10. The touch screen scanning device 10 is configured to perform a display scan and/or at least one touch scan in each frame scanning cycle, perform one of the display scan and the at least one touch scan in each period of each the frame scanning cycle, and complete the display scan and/or the at least one touch scan in each the frame scanning cycle.

It is understandable that the touch scan is one of a capacitive touch scan, an electromagnetic touch scan, a resistive touch scan, an infrared touch scan, an acoustic touch scan, and an optical touch scan.

For example, when the touch screen is used as an electromagnetic capacitive touch screen, the touch scan is the capacitive touch scan or the electromagnetic touch scan.

At this time, the touch screen scanning device 10 is configured to perform the display scan, the capacitive touch scan, and the electromagnetic touch scan in each period of each frame scanning cycle. That is, the display scan, the capacitive touch scan, and the electromagnetic touch scan are performed in a time-sharing manner in each frame scanning cycle. Thus, in each frame scanning cycle, the display scan, the capacitive touch scan, or the electromagnetic touch scan is completed.

In the touch screen scanning device 10 of the embodiment of the present disclosure, when a timing controller of the touch screen controls more than two touch scan signals at the same time, if more than two touch scans are performed at the same period, the two touch scan signals are likely to interfere with each other. In the touch screen scanning method, the device, and the system, the display scan and/or the at least one touch scan are performed in a time-sharing manner in each frame scanning cycle. That is, only the display scan or only the one touch scan is performed in each period of each frame scanning cycle. Thus, the display scan and/or the at least one touch scan are completed in each frame scanning cycle, such that the display scan and the at least one touch scan do not interfere with each other when they are performed, thereby ensuring accuracy of a scan result and display performance of the touch screen.

Figure 7:
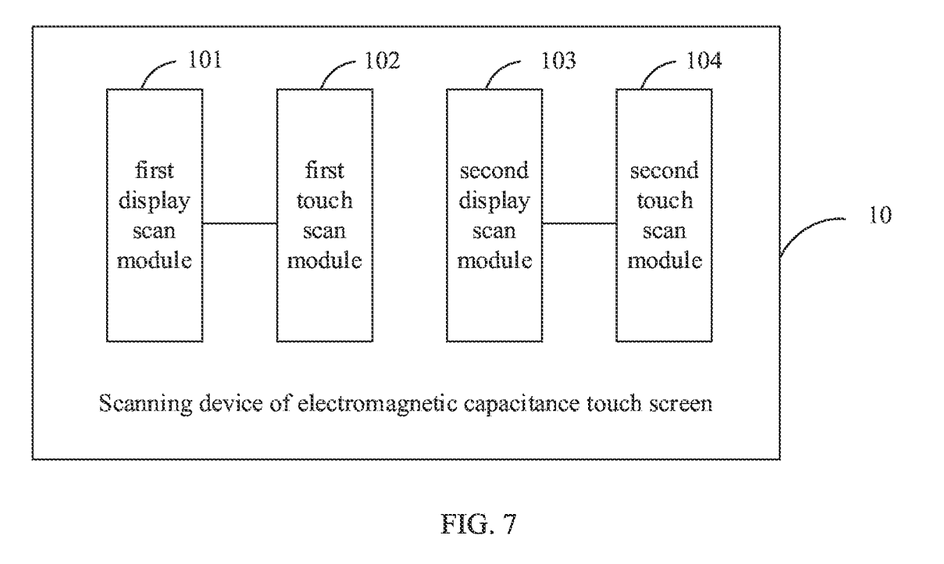
FIG. 7 is a schematic diagram of a touch screen scanning device of an embodiment of the present disclosure.

In some embodiments, each frame scanning cycle includes a display period and a field blanking period. FIG. 7 is a schematic diagram of a touch screen scanning device of an embodiment of the present disclosure. As shown in FIG. 7, the touch screen scanning device 10 includes a first display scan module 101 and a first touch scan module 102.

The first display scan module 101 is configured to perform a display scan in the display period.

The first touch scan module 102 is configured to perform the capacitive touch scan and the electromagnetic touch scan in a time-sharing manner in the field blanking period, and complete the capacitive touch scan and the electromagnetic touch scan in the field blanking period.

In the touch screen scanning device 10 of the embodiment of the present disclosure, the display scan, the capacitance scan, and the electromagnetic touch scan are performed through the first display scan module 101 and the first touch scan module 102 in each period of each frame scanning cycle. Thus, in each frame scanning cycle, the display scan, the capacitive touch scan, or the electromagnetic touch scan is completed, so that the three scanning methods of the display scan, the capacitive touch scan, and the electromagnetic touch scan do not interfere with each other, thereby ensuring the accuracy of the scan results and the display performance of the touch screen.

Figure 8:
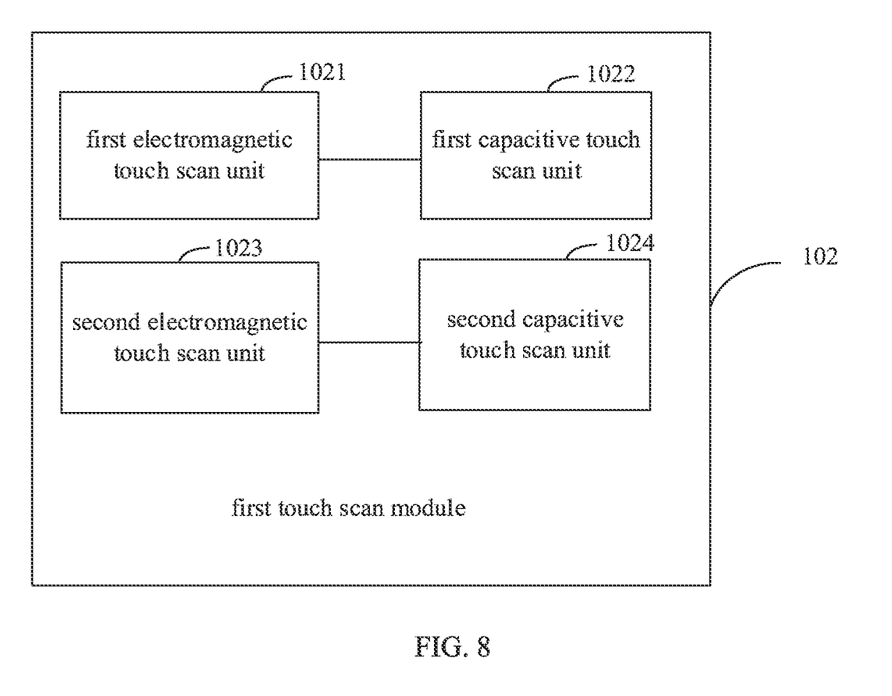
FIG. 8 is a schematic diagram of a first touch scan module of a touch screen scanning device of an embodiment of the present disclosure.

In some embodiments, the field blanking period includes a first period and a second period that are performed sequentially. FIG. 8 is a schematic diagram of a first touch scan module of a touch screen scanning device of an embodiment of the present disclosure. Referring to FIG. 1, FIG. 2, and FIG. 8, the first touch scan module 102 includes a first electromagnetic touch scan unit 1021 and a first capacitive touch scan unit 1022. The first electromagnetic touch scan unit 1021 is configured to perform the electromagnetic touch scan in the first period. The first capacitive touch scan unit 1022 is configured to perform the capacitive touch scan in the second period. Alternatively, the first capacitive touch scan unit 1022 is configured to perform the capacitive touch scan in the first period. The first electromagnetic touch scan unit 1021 is configured to perform the electromagnetic touch scan in the second period.

In some embodiments, refer to FIG. 3 and FIG. 8, the first touch scan module 102 further includes a second electromagnetic touch scan unit 1023 and a second capacitive touch scan unit 1024. The second electromagnetic touch scan unit 1023 and the second capacitive touch scan unit 1024 are configured to perform alternately the electromagnetic touch scan and the capacitive touch scan in the field blanking period.

In some embodiments, each frame scanning cycle includes a plurality of sub-frame scanning cycles. Each sub-frame scanning cycle includes a sub-display period and a sub-field blanking period. As shown in FIG. 7, the touch screen scanning device 10 also includes a second display scan module 103 and a second touch scan module 104. The second display scan module 103 is configured to perform the display scan in the sub-display period. The second touch scan module 104 is configured to perform the electromagnetic touch scan in a portion of the sub-field blanking period, and perform the capacitive touch scan in another portion of the sub-field blanking period.

Figure 9:
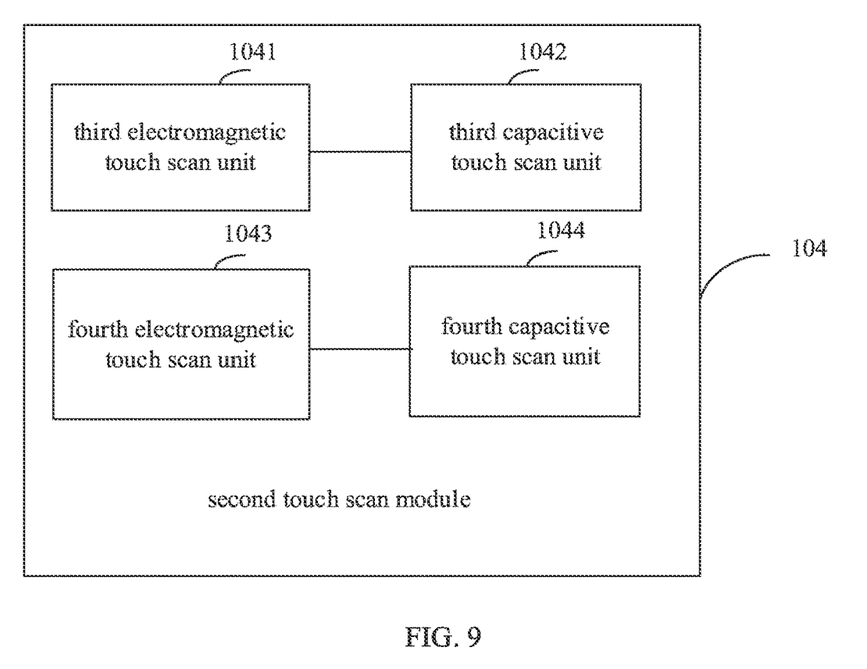
FIG. 9 is a schematic diagram of a second touch scan module of a touch screen scanning device of an embodiment of the present disclosure.

In some embodiments, each frame scanning cycle includes a first portion of the sub-frame scanning cycle and a second portion of the sub-frame scanning cycle that are performed sequentially. FIG. 9 is a schematic diagram of a second touch scan module of a touch screen scanning device of an embodiment of the present disclosure. As shown in FIG. 4, FIG. 5, and FIG. 9, the second touch scan module 104 includes a third electromagnetic touch scan unit 1041 and a third capacitive touch scan unit 1042. The third electromagnetic touch scan unit 1041 is configured to perform the electromagnetic touch scan in the first portion of the sub-field blanking period of the sub-frame scanning cycle. The third capacitive touch scan unit 1042 is configured to perform the capacitive touch scan in the second portion of the sub-field blanking period of the sub-frame scanning cycle. Alternatively, the third electromagnetic touch scan unit 1041 is configured to perform the capacitive touch scan in the first portion of the sub-field blanking period of the sub-frame scanning cycle. The third capacitive touch scan unit 1042 is configured to perform the electromagnetic touch scan in the second portion of the sub-field blanking period of the sub-frame scanning cycle.

In some embodiments, as shown in FIG. 6 and FIG. 9, the second touch scan module 104 further includes a fourth electromagnetic touch scan unit 1043 and a fourth capacitive touch scan unit 1044. The fourth electromagnetic touch scan unit 1043 and the fourth capacitive touch scan unit 1044 are configured to alternately perform the electromagnetic touch scan and the capacitive touch scan in the sub-field blanking period of the plurality of sub-frame scanning cycles that are performed sequentially.

Figure 10:
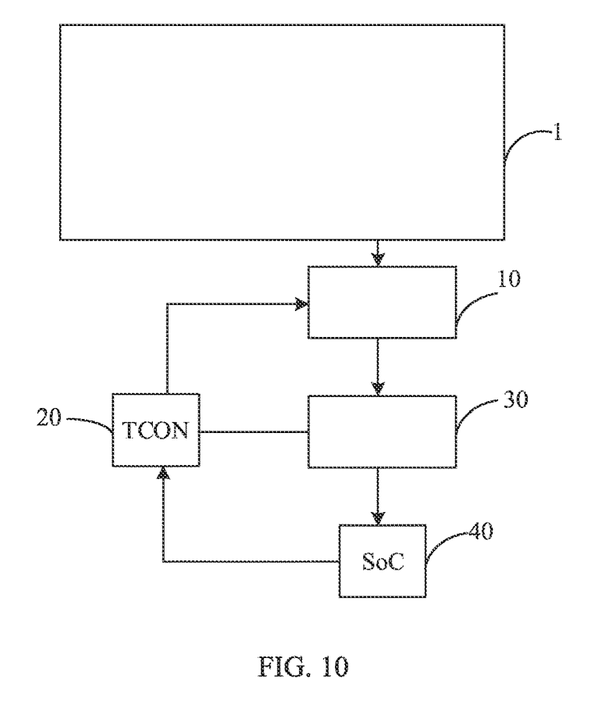
FIG. 10 is a schematic diagram of a touch screen scanning system of an embodiment of the present disclosure.

Based on the foregoing embodiments, FIG. 10 is a schematic diagram of a touch screen scanning system of an embodiment of the present disclosure. As shown in FIG. 10, the embodiment of the present disclosure also provides the s touch screen scanning system. The scanning system includes a touch screen scanning device 10, a timing controller 20, a touch signal processor 30, and a front-end system chip 40.

The touch screen scanning device 10 is configured to acquire a touch signal of the touch screen 1 and transmit the display signal to a touch screen 1.

The timing controller 20 is configured to control the acquisition of the touch signal of the touch screen 1 and control a timing of transmitting the display signal to the touch screen 1.

The touch signal processor 30 is configured to perform a data processing on the acquired touch signal.

The front-end system chip 40 is configured to transmit an image signal and the touch signal after performing the data processing to the timing controller 20.

Specifically, a working process of the touch screen scanning system is as follows. The touch screen scanning device 10 acquires the touch signal of the touch screen 1 under the timing control of the timing controller 20 (Tcon, timer control register). After the touch signal is input to the touch signal processor 30 for data processing, the touch signal processor 30 inputs the data-processed touch signal to the front-end system chip 40 (Soc, system on chip). The front-end system chip 40 integrates the touch signal and the display signal and inputs it to the timing controller 20. The timing controller 20 inputs the display signal combined with the touch signal to the touch screen 1 for screen display.

In some embodiments, the touch signal processor 30 includes a filter circuit (not shown in the drawings), and the filter circuit is configured to filter the acquired touch signal.

In some embodiments, when the touch screen is used as an electromagnetic capacitive touch screen, the touch screen scanning device 10 is composed of a touch and display driver integration (TDDI) chip and an electromagnetic driver chip. The TDDI chip is configured to acquire the capacitive touch signal of the touch screen 1 and input the display signal to the touch screen 1. The electromagnetic drive chip is configured to acquire the electromagnetic touch signal of the touch screen 1.

In summary, the embodiments of the present disclosure provide the touch screen scanning method, the device, and the system. Only the display scan or any one of the touch scans is performed in each period of each frame scanning cycle. The display scan and the at least one touch scan are performed in the time-sharing manner in each frame scanning cycle, and then the display scan or at least one touch scan is completed in each frame scanning cycle. The display scan and the at least one touch scan do not interfere with each other during each process, thereby ensuring the accuracy of the scan result and the display performance of the touch screen.

It can be understood that for those of ordinary skill in the art, equivalent replacements or changes can be made according to the technical solutions of the present disclosure and its inventive concept. All these changes or replacements shall fall within the protection scope of the claims of the present disclosure.

What is claimed is:

1. A scanning method for a touch screen, comprising:
performing display scanning, capacitive touch scanning, and electromagnetic touch scanning within each image frame scanning cycle for the touch screen,
wherein the each image frame scanning cycle comprises at least one display period and at least one vertical blanking interval;
the display scanning is performed only within the at least one display period; and
the capacitive touch scanning and the electromagnetic touch scanning are performed respectively at different times only within the at least one vertical blanking interval.

2. The touch screen scanning method according to claim 1, wherein each of the at least one vertical blanking interval comprises a first sub-interval and a second sub-interval that are performed sequentially;
wherein the electromagnetic touch scan is performed in the first sub-interval, and the capacitive touch scan is performed in the second sub-interval; or
the capacitive touch scan is performed in the first sub-interval and the electromagnetic touch scan is performed in the second sub-interval.

3. The touch screen scanning method according to claim 1, wherein the electromagnetic touch scan and the capacitive touch scan are alternately performed in each of the at least one vertical blanking interval.

4. The touch screen scanning method according to claim 1, wherein the at least one display period comprises a plurality of display periods, and the at least one vertical blanking interval comprises a plurality of vertical blanking intervals.

5. The touch screen scanning method according to claim 4, wherein each of the plurality of vertical blanking intervals comprises a first sub-interval and a second sub-interval that are performed sequentially;
wherein the electromagnetic touch scan is performed in the first sub-interval, and the capacitive touch scan is performed in the second sub-interval; or
the capacitive touch scan is performed in the first sub-interval and the electromagnetic touch scan is performed in the second sub-interval.

6. The touch screen scanning method according to claim 4, wherein the electromagnetic touch scan and the capacitive touch scan are alternately performed in each of the plurality of vertical blanking intervals.

7. A touch screen scanning device, wherein the scanning device comprises a chip configured to perform operations comprising:
performing display scanning, capacitive touch scanning, and electromagnetic touch scanning within each image frame scanning cycle for the touch screen,
wherein the each image frame scanning cycle comprises at least one display period and at least one vertical blanking interval;
the display scanning is performed only within the at least one display period; and
the capacitive touch scanning and the electromagnetic touch scanning are performed respectively at different times only within the at least one vertical blanking interval.

8. The touch screen scanning device according to claim 7, wherein each of the at least one vertical blanking interval comprises a first sub-interval and a second sub-interval that are performed sequentially;
wherein the electromagnetic touch scan is performed in the first sub-interval, and the capacitive touch scan is performed in the second sub-interval; or
the capacitive touch scan is performed in the first sub-interval and the electromagnetic touch scan is performed in the second sub-interval.

9. The touch screen scanning device according to claim 7, wherein the electromagnetic touch scan and the capacitive touch scan are alternately performed in each of the at least one vertical blanking interval.

10. The touch screen scanning device according to claim 7, wherein the at least one display period comprises a plurality of display periods, and the at least one vertical blanking interval comprises a plurality of vertical blanking intervals.

11. The touch screen scanning device according to claim 10, wherein each of the plurality of vertical blanking intervals comprises a first sub-interval and a second sub-interval that are performed sequentially;
wherein the electromagnetic touch scan is performed in the first sub-interval, and the capacitive touch scan is performed in the second sub-interval; or
the capacitive touch scan is performed in the first sub-interval and the electromagnetic touch scan is performed in the second sub-interval.

12. The touch screen scanning device according to claim 10, wherein the electromagnetic touch scan and the capacitive touch scan are alternately performed in each of the plurality of vertical blanking intervals.

13. A touch screen scanning system, comprising: a timing controller, a touch signal processor, a front-end system chip, and a touch screen scanning device of claim 7;
- wherein the touch screen scanning device is configured to acquire a touch signal of the touch screen under a timing control of the timing controller, transmit the touch signal to the touch signal processor, acquire a display signal, and transmit the display signal to a touch screen;
- the timing controller is configured to control the touch screen scanning device to acquire the touch signal, and transmit a timing of the display signal to the touch screen;
- the touch signal processor is configured to perform a data processing on the touch signal, and transmit the processed touch signal to the front end system ship; and
- the front-end system chip is configured to transmit the display signal and the processed touch signal to the timing controller.

14. The touch screen scanning system according to claim 13, wherein the touch signal processor comprises a filter circuit, and the filter circuit is configured to filter the touch signal.

* * * * *